Aug. 14, 1945.  R. H. OSBORN  2,382,439
COLOR GRADING APPARATUS AND METHOD
Filed June 19, 1941
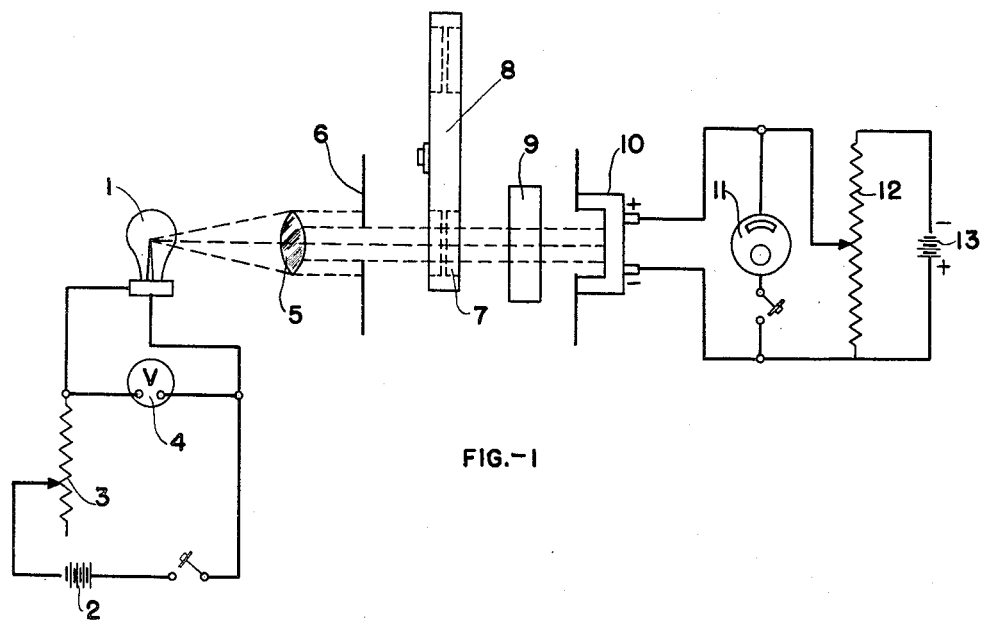
FIG.-1
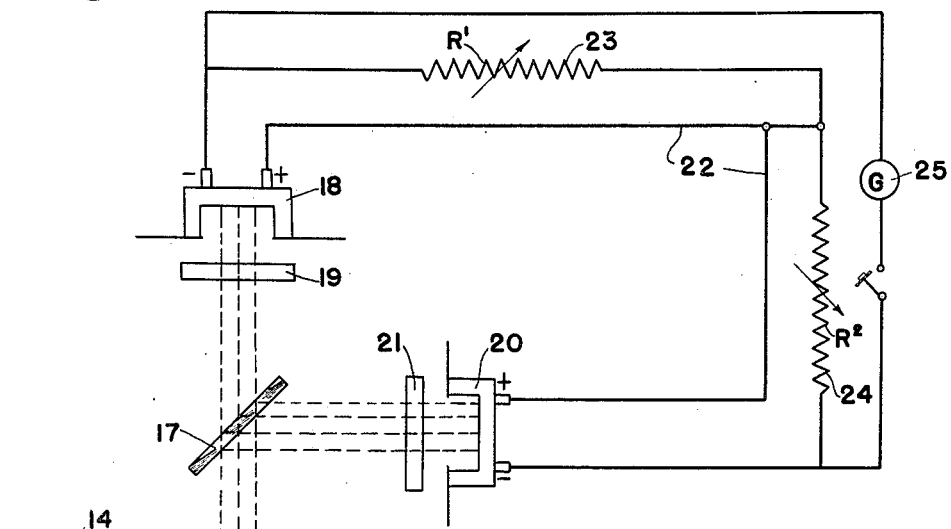
FIG.-2
ROBERT H. OSBORN
*INVENTOR.*
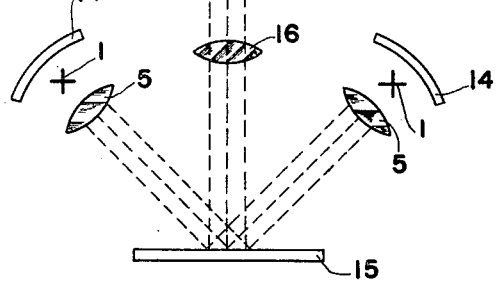

Patented Aug. 14, 1945

2,382,439

UNITED STATES PATENT OFFICE 2,382,439

COLOR GRADING APPARATUS AND METHOD

Robert H. Osborn, Wilmington, Del., assignor to Hercules Powder Company, Wilmington, Del., a corporation of Delaware Application June 19, 1941, Serial No. 398,714

11 Claims. (Cl. 88—14)

This invention relates to a photoelectric instrument for grading transparent, translucent or opaque products by giving readings proportional to the ratios of the transmission or reflection factors of such products for light of two different colors.

A number of instruments have been described in the prior art in which transmission or reflection factors for light of two or more colors are measured. For certain types of colorimetric work quantities involving ratios of such transmission or reflection factors are required; for example, $x$, $y$, and $z$ trichromatic coefficients according to the 1931 I. C. I. (International Commission on Illumination) specifications. For further information on this subject see Hardy's "Handbook of Colorimetry"—M. I. T. Press, Cambridge—1936. When using instruments known to the art, these ratios must be calculated mathematically from the data furnished by instruments of the foregoing type in a number of determinations. Other instruments typified by that of Evelyn, U. S. 2,193,315, measure quantities proportional to the ratios of transmission or reflection factors of two different materials, usually the standard and the specimen, for light of the same color. Still another type of instrument is that described in Wilson, U. S. No. 2,008,410, which gives readings proportional to the differences between the transmission or reflection factors of materials for light of two different colors.

The object of the present invention is to provide an improved apparatus for measuring the color of transparent, translucent or opaque materials by single meter or dial readings.

Another object is to provide an improved method of measuring the color of such materials by single readings.

I have found that by the employment of suitable optical, mechanical and electrical means in a suitable way, quantities proportional to the ratios of the transmission or reflection factors of materials for light of two different colors can be obtained by means of single meter or dial readings. However, although my invention is particularly adapted to the determination of the ratio of the amount of one color to the amount of another color in the sample, the embodiments described herein may be modified so as to measure the ratio of a function of one or more colors to a function of one or more different colors, as for example, by using more than two photocells.

Generally described, the color analyzing apparatus of the present invention comprises a light source, photocell means, a plurality of differently colored light filters, means for passing light from the source along a plurality of paths, each of which includes reflection from or transmission through the object being analyzed, transmission through one of the filters, independently of other paths and independently of the other filters, and thence into impingement upon a photocell means associated with the filter in question, and means for giving a reading which is proportional to the ratio of the outputs of the photocell means for at least two of the paths. In this way, there is obtained a reading which is proportional to the ratio of transmissions or reflections of the object being analyzed for light of the two or more colors defined by the filter-photocell-source combinations employed in the several paths. In its broader sense, the invention includes the formation of the paths referred to either simultaneously or consecutively. For example, I may break the beam of light after it has passed the object being analyzed into two beams and pass each of the beams thus formed through separate differently colored filters each associated with its own photocell, and employ suitable electrical and translating means for giving a value proportional to the ratio of the outputs of the two photocells and thereby giving a value proportional to the ratio of transmission or reflection factors of the object for light of the two different colors represented by the two filter-photocell-source combinations.

Color, or more exactly, chromaticity, can be expressed precisely in terms of reflection or transmission factors only by means of ratios of these quantities. Obviously, an instrument and method which will give single readings proportional to such ratios will have marked advantages over one giving a number of readings from which the ratios must be computed or one which gives only differences in these quantities. An instrument of the type herein described has the further advantage of greater flexibility in determining the color of a material. This greater flexibility is at least partly due to the fact that by simple changes in the electric circuit of the type employed in accordance with the present invention, the instrument scale may be expanded or contracted at will, thus permitting the measurement of light, medium or dark samples. The instrument has a further advantage of simplicity of operation since the plot of points representing the color characteristics of a series of colored samples of the same material often follows a definite locus on the I. C. I. color mixture diagram. Obtaining a single colorimetric variable such as one of the trichromatic coefficients is usually sufficient to grade the sample. A grading may thus be obtained from a single reading of a photoelectric color grader of the type herein described. A colorimetric ratio such as the $x$-trichromatic coefficient can be obtained from prior art instruments only by mathematical calculations based on three or more readings.

In the accompanying drawing, there are illustrated two preferred embodiments of the apparatus of the present invention. In this drawing:

Fig. 1 is a diagrammatic representation of one form of apparatus which has been found to be especially satisfactory for grading transparent or translucent materials such as for example rosin, other resins, and naval stores products. Fig. 2 is a diagrammatic showing of one form of the apparatus of the present invention which has been found to be especially satisfactory for grading opaque samples.

In the form of the invention illustrated by Fig. 1, the apparatus consists of one or more light sources such as incandescent lamps, metallic arcs or other suitable illuminating devices, a suitable optical system for properly directing and condensing the light, means for continuously varying the intensity of the light beam such as an iris diaphragm or a neutral wedge, two differently colored filters for altering the spectral character of the light, a receiving system consisting of a photocell, and a measuring system embodying an electric circuit with the aid of which the output of the photocell may be measured in such manner that a single meter or dial reading is obtained which is proportional to the ratio of the electrical response of the photocell when illuminated by light of one color transmitted or reflected by a sample, to the electrical response of the same photocell illuminated in the same manner except with light of a different color.

Referring to Fig. 1 in particular, 1 is a light source such as an incandescent bulb lit by means of battery 2 controlled by rheostat 3, the voltage being indicated by voltmeter 4. Light from lamp 1 passes through a suitable collimating lens 5, thence through iris diaphragm 6 and through one of the filters 7 mounted in rotatable filter holder 8 which carries a plurality of differently colored filters. Light then passes through the transparent or translucent specimen or sample, 9 to photocell 10. Across photocell 10 is connected microammeter 11. A variable potentiometer 12 connected across battery 13 which may conveniently be an ordinary 1½ volt dry cell, is provided. The fixed lead of the potentiometer 12 is connected to the negative side of the photocell 10 and the variable lead of the potentiometer 12 is connected to the positive side of the photocell.

If a sample of transparent or translucent material such as, for example, rosin is placed in position between the filter holder 8 and the photocell 10 with an approximately neutral filter in position, the microammeter 11 may be set at some predetermined value by adjusting the iris diaphragm 6. Then, without changing this adjustment, and leaving everything else the same, an amber filter is inserted in place of the neutral filter. The microammeter 11 will then indicate a value which will be proportional to the ratio of the transmission of the sample for the amber beam of light to its transmission for the neutral beam. This ratio in turn is proportional to the $x$-trichomatic coefficient of the sample, since $x$ is approximately equal to the ratio of the transmission of the sample for a properly chosen amber stimulus to the sum of its transmissions for properly chosen amber, green and blue stimuli. (The sum of the transmissions of the sample for amber, green and blue stimuli is proportional to its transmission for the above-mentioned approximately neutral stimulus.)

By varying the constants of the circuit shown schematically in Figure 1, it is possible to expand the scale of values beyond the point which would be possible if the microammeter 11 were connected directly and solely to the photocell. By means of the circuit shown, a "bucking" potential is applied to the photocell by means of the voltage drop across a portion of the potentiometer circuit through which the current from the dry cell 13 is flowing. Small changes in the light absorbing qualities of different samples are magnified on the meter scale since a given percentage change in absorption represents a larger absolute amount of light absorbed than in the case of the directly connected microammeter which gives a direct reading of the photocell current. This, in turn, represents a larger difference in microammeter readings than in the case (described above) where the microammeter is connected directly and solely to the photocell. In effect, the scale may be contracted or expanded as desired within practicable limits.

The iris diaphragm 6 provides means for varying by infinitely small degrees the intensity of the light beam over the entire range from 0 to a maximum. Instead of this arrangement any other suitable means for effecting intensity variation may be employed such as a neutral wedge or the like.

Calibration of the apparatus of Fig. 1 may be made using a set of permanent standards closely approximating the color series of the rosin or other material which is to be analyzed. Preferably, the instrument should be calibrated once each day. The calibration may be carried out by inserting a standard in the position for the sample with the neutral filter in position, adjusting the iris diaphragm 6 until the microammeter 11 shows a predetermined reading, quickly substituting the amber filter and taking the reading of the microammeter with it in position. For dark-colored standards, a light blue green filter and a red filter may be substituted for the neutral filter and the amber filter respectively. Calibrations should hold for a reasonable length of time depending upon how often the instrument is used. Factors which may change calibration include blackening of the lamp 1 with age due to condensation of tungsten on the surface, and gathering of dust on the filters.

That the second reading due to the photocell output with the amber filter in place is directly proportional under the optimum conditions prevailing under normal use (i. e., with low light intensities and with the photocell at normal temperature) to the ratio of the transmission of the sample for amber light to the transmission for neutral light is shown by the following analysis:

Let $i_{p_1}$ = the photocell output with the approximately neutral filter in position Let $i_{p_2}$ = the photocell output with the amber filter in position Let I = lamp intensity Let $B_{f_1}$ = luminosity of filter for neutral light Let $B_{f_2}$ = luminosity of filter for amber light Let $B_{s_1}$ = luminosity of sample for neutral light
Let $B_{s_2}$ = luminosity of sample for amber light
Let $k_1$ and $k_2$ = constants
then $$i_{p_1} = k_1 I B_{f_1} B_{s_1} \quad (1)$$
$$i_{p_2} = k_2 I B_{f_2} B_{s_2} \quad (2)$$

Dividing Equation 2 by Equation 1

$$\frac{i_{p_2}}{i_{p_1}} = \frac{k_2 B_{f_2} B_{s_2}}{k_1 B_{f_1} B_{s_1}} = C \frac{B_{s_2}}{B_{s_1}}$$

where C is a constant equaling $$\frac{k_2 B_{f_2}}{k_1 B_{f_1}}$$

Then $$i_{p_2} = K \frac{B_{s_2}}{B_{s_1}}$$

where $K$ = a constant = $C \cdot i_{p_1}$ (Since $i_{p_1}$ is set to a predetermined value at each measurement it becomes a constant).

The modification shown in Fig. 2 has been found to be very useful for measuring the color of opaque samples. In this modification, there are employed a light source, means for properly directing light from the source onto the sample and then in a reflected beam away from the sample, means for splitting the reflected beam of light into two beams of the same or different intensity, two differently colored filters each of which is associated with one of two photocells, and a measuring system so arranged that a single meter or dial reading is obtained which is proportional to the ratio of the simultaneous electric responses of the two photocells.

Referring to Fig. 2 in detail, two lamps 1 are mounted so that their filaments are at the centers of curvature of two concave spherical mirrors 14, one of which is mounted behind each lamp 1. In front of each lamp 1 is mounted a collimating lens 5 at a distance away from the lamp filament equal to the focal length of the lens. This provides a parallel beam of light from each lamp 1 which strikes the sample 15 being graded. Light from the brightly illuminated spot on the sample 15 is collected by a viewing lens 16 and strikes a piece of clear glass 17 inclined at an angle of 45° to the optical axis of the viewing lens 16. Approximately 92% of the light passes through glass 17 and is focused on a barrier layer type of photocell 18 in front of which is a violet filter 19. The remaining 8% of the light is reflected from the surfaces of the glass 17 and is focused on a second photocell 20 substantially identical with photocell 18 and in front of which is a red filter 21. The transmissions of the two filters 19 and 21 are such that substantially the same amount of light reaches the two photocells 18 and 20 if the sample being measured is white.

The relative outputs of the two photocells 18 and 20 are measured by the electric circuit shown diagrammatically in Fig. 2. The positive terminals of the photocells 18 and 20 are connected together by a wire 22. Across photocell 18 is connected a variable resistance 23 and across photocell 20 is connected an accurate dial box resistance 24. Between the negative terminals of photocells 18 and 20 is connected a galvanometer 25.

The method of procedure for analyzing an opaque sample such as a sample of cotton linters with the apparatus of Fig. 2 is as follows:

A standard of approximately neutral color characteristics is placed in position, the dial box resistance 24 is adjusted to a value of say 1000 ohms whereupon the variable resistance 23 is adjusted until the galvanometer 25 reads 0. A sample of the material to be graded is then quickly substituted for the standard and dial box resistance 24 is adjusted until the galvanometer again reads 0. The value to which resistance 24 is thus adjusted is taken as the instrument reading for the color of the sample. When measuring the color of opaque samples other than white, a standard set of porcelain or opaque glass tiles in the color range of the samples to be measured should be used for the basic calibration and for the initial setting of the instrument.

That the setting of resistance 24 to establish balance is directly proportional to the ratio of the reflection factor of the sample for violet light to its reflection factor for red light is shown by the following mathematical analysis:

Let
I = intensity of source by which sample is illuminated
$r_v$ = reflectance of sample for violet light
$r_r$ = reflectance of sample for red light
$i_1$ = current through resistance 23
$i_2$ = current through resistance 24
$E_1$ = potential across resistance 23
$E_2$ = potential across resistance 24
$k_1$, $k_2$ and $k$ = constants depending on the characteristics of the photocells and the spectral transmissions of the colored glass filters 19 and 21.
$R_1$ = resistance of resistor 23
$R_2$ = resistance of resistor 24

Since, for low light intensities and small exterior resistances, the current flowing in a barrier layer photocell circuit is known to be directly proportional to the intensity of illumination, we may write:

$i_1 = k_1 I r_v$ for the current in the violet filtered photocell circuit, and:

$i_2 = k_2 I r_r$ for the current in the red filtered photocell circuit.

For the potentials across the two resistors 23 and 24 we may write:

$$E_1 = i_1 R_1 = k_1 I r_v R_1$$

and $$E_2 = i_2 R_2 = k_2 I r_r R_2$$

For the condition of balance where the galvanometer reads 0:

$$E_1 = E_2$$

or $$k_1 I r_v R_1 = k_2 I r_r R_2$$

from which $$\frac{R_1}{R_2} = \frac{k_2 r_r}{k_1 r_v} = K \frac{r_r}{r_v} \left( \text{where } K = \frac{k_2}{k_1} \right)$$

Since $R_1$ was held constant for the two successive adjustments of the galvanometer reading to 0, $R_2$ is directly proportional to the ratio of the reflection factor of the sample for violet light to its reflection factor for red light.

It has been found preferable to use a circular barrier layer type photocell in the color analyzing apparatus of the present invention. However, with suitable modifications, any other type of photocell may be employed.

From the foregoing it will be seen that the apparatus and method of the present invention makes it possible to determine the ratios of transmission or reflection factors of a sample of transparent, translucent or opaque material for light of different wave lengths by means of single meter or dial readings. This is accomplished without the necessity for taking a plurality of readings on the same material and without the necessity for mathematically computing the desired ratio from a plurality of successive readings as is necessary when using prior art practice with which I am familiar. Numerous other advantages of the apparatus and method of the present invention will be at once apparent to those skilled in the art.

As will be obvious to those skilled in the art, the required spectral transmissions of the filters will depend upon the characteristics of the light source and of the photocell. If, for example, the tristimulus values are desired, the spectral transmissions of the three filters required would be given by the following equations:

$$T_X = \frac{k_X X E'}{sE}$$

$$T_Y = \frac{k_Y Y E'}{sE}$$

$$T_Z = \frac{k_Z Z E'}{sE}$$

Where

X, Y, and Z are the spectral distribution coefficients defining the 1931 I. C. I. standard observer according to the 1931 I. C. I. coordinate system.

E is the spectral energy of the light source used with the filters and photocells used in the measurement.

E' is the spectral energy of average daylight or other illuminant by which the samples are ordinarily viewed.

s is the spectral response of the photocell to an equal energy stimulus.

$k_x, k_y, k_z$ are constants.

See Bureau of Standard's Letter Circular LC–545 (Mar. 8, 1939).

Thus the selection of correct filters is within the skill of the art.

It will be understood that the details hereinbefore set forth are illustrative only and that the invention as claimed is in no way limited thereby.

What I claim and desire to protect by Letters Patent is:

1. A method of analyzing the color of a transparent or translucent object which comprises passing light from a light source onto a photocell through said object and through a colored filter having a spectral transmission characteristic such that the response of the photocell associated therewith is proportional to the sum of the tristimulus values of such object, adjusting the effective amount of light entering said photocell until the indicated response of said photocell is at a predetermined figure, then without changing the adjustment substituting a differently colored filter having a spectral transmission characteristic such that the response of the photocell associated therewith is proportional to one of the tristimulus values of said object, and observing the indicated response of said photocell for said differently colored filter, thereby measuring a value proportional to the ratio of said photocell responses.

2. A method of analyzing the color of an opaque object which comprises reflecting a beam of light from a standard opaque object of approximately neutral color characteristics, dividing said reflected beam into a pair of beams identical in color content, simultaneously passing said beams singly and independently through two differently colored filters and onto two photocells associated therewith, one of said filters having a spectral transmission characteristic such that the response of the photocell associated therewith is proportional to one of the tristimulus values of said object, the other of said filters having a spectral transmission characteristic such that the response of the photocell associated therewith is proportional to the sum of the tristimulus values of said object, adjusting one of the resistances in the outputs of said photocells to a predetermined value, adjusting the other of said resistances until balance is established in the output circuits of said photocells, substituting the opaque object to be analyzed for said standard, adjusting said one of the resistances until balance is again established, and observing the degree of adjustment of said one of said resistances required to establish said second balance, the figure obtained being proportional to the ratio of said photocell responses.

3. A method of analyzing the color of cotton linters which comprises reflecting a beam of light from a standard opaque object of approximately neutral color characteristics, dividing said reflected beam into a pair of beams identical in color content, simultaneously passing said beams singly and independently through a red filter and through a violet filter onto two photocells associated with said filters, adjusting one of the resistances in the outputs of said photocells to a predetermined value, adjusting the other of said resistances until balance is established in the output circuits of said photocells, substituting the sample of cotton linters to be analyzed for said standard, adjusting said one of the resistances until balance is again established, and observing the degree of adjustment of said one of said resistances required to establish said second balance, the figure obtained being proportional to the ratio of said photocell responses.

4. Color analyzing apparatus comprising photocell means, two differently colored filters, a light source, means for impinging light from said source along a plurality of paths each of which includes the object being analyzed one of said filters and the photocell means associated therewith, the filter in one of said paths having a spectral transmission characteristic such that the response of the photocell means is proportional to one of the tristimulus values of said object, the filter in the other of said paths having a spectral transmission characteristic such that the response of the photocell means is proportional to the sum of the tristimulus values of said object, and means for indicating by a single reading a value proportional to the ratio of the photocell responses.

5. Color analyzing apparatus comprising a light source, photocell means, means for impinging light from said source along a path which includes the object being analyzed and said photocell means, two differently colored filters each of which is adapted to be associated singly with a single photocell means, one of said filters having a spectral transmission characteristic such that the response of the photocell means is proportional to one of the tristimulus values of said object, the other of said filters having a spectral transmission characteristic such that the response of the photocell means is proportional to the sum of the tristimulus values of said object, means for indicating a value proportional to the ratio of the photocell responses, means for expanding or contracting the effective scale length of said indicating means, and means for adjusting the initial reading of said indicating means.

6. Color analyzing apparatus comprising a photocell means, a light source, two differently colored filters, means for impinging light from said source along a path which includes the object being analyzed and said photocell means, means for introducing said filters individually into said path of said light, one of said filters having a spectral transmission characteristic such that the response of the photocell means is proportional to one of the tristimulus values of said object, the other of said filters having a spectral transmission characteristic such that the response of the photocell means is proportional to the sum of the tristimulus values of said object, and means for indicating by a single reading a value proportional to the ratio of the photocell responses.

7. Color analyzing apparatus for analyzing the color of transparent or translucent objects comprising a light source, photocell means, means for impinging light from said source along a path through the object being analyzed and then onto said photocell means, means for continuously varying the intensity of the light beam before it passes through said object, two differently colored filters, means for inserting said filters singly into said light beam passing through said object, one of said filters having a spectral transmission characteristic such that the response of the photocell means is proportional to one of the tristimulus values of said object, the other of said filters having a spectral transmission characteristic such that the response of the photocell means is proportional to the sum of the tristimulus values of said object, a means for indicating by a single reading a value proportional to the ratio of the photocell responses including a microammeter connected across the output leads of said photocell means, a variable potentiometer, and a battery connected across the fixed leads of said potentiometer, one fixed lead of said potentiometer being connected to one side of said microammeter and the variable lead of said potentiometer being connected to the other side of said microammeter.

8. Color analyzing apparatus comprising a light source, two photocell means, a plurality of differently colored filters each independently associated with one of said photocell means, means for projecting light from said source along a path including an object, means for dividing said light after it leaves said object into a plurality of beams corresponding in number to the pairs of said photocell means and filters, means for passing each of said beams singly and independently through one of said filters and thence onto the photocell means one of said filters having a spectral transmission characteristic such that the response of the photocell means is proportional to one of the tristimulus values of said object, the other of said filters having a spectral transmission characteristic such that the response of the photocell means is proportional to the sum of the tristimulus values of said object, and means for indicating by a single reading a value proportional to the ratio of the photocell responses.

9. Color analyzing apparatus for analyzing the color of opaque objects comprising a light source, two substantially identical photocells, two differently colored filters each independently associated with one of said photocells, means for projecting light from said source into an object to be analyzed, an angularly disposed transparent member in the path of said light after it leaves said object for dividing said light into a beam reflected by said member and a beam transmitted by said member, said beams taking separate paths, each of said beams passing individually through one of said filters onto the photocell associated therewith, the filter in one of said paths having a spectral transmission characteristic such that the response of the photocell is proportional to one of the tristimulus values of said object, the filter in the other of said separate paths having a spectral transmission characteristic such that the response of the photocell is proportional to the sum of the tristimulus values of said object, and means for indicating by a single reading a value proportional to the ratio of the photocell responses.

10. A method of analyzing the color of an object which comprises passing light from a light source along two paths each of which includes the object being analyzed, one of two filters and one of two photocell means, one of said filters having a spectral transmission characteristic such that the response of the photocell means associated therewith is proportional to one of the tristimulus values of said object, the other of said filters having a spectral transmission characteristic such that the response of the photocell means associated therewith is proportional to the sum of the tristimulus values of said object, and measuring a value proportional to the ratio of the photocell responses.

11. A method of analyzing the color of a resin which comprises passing light from a light source onto a photocell through said resin and a filter having a spectral transmission characteristic such that the response of the photocell associated therewith is proportional to the sum of the tristimulus values of said resin, adjusting the effective amount of light entering said photocell until the indicated response of said photocell is at a predetermined figure, then, without changing any other factors, substituting a filter having a spectral transmission characteristic such that the response of the photocell associated therewith is proportional to the amber tristimulus value of said resin, and observing the indicated response of said photocell for said amber tristimulus filter, thereby measuring a value proportional to the ratio of the responses of said photocell.

ROBERT H. OSBORN.